W. C. FARNUM.
GEAR REDUCTION MECHANISM.
APPLICATION FILED DEC. 28, 1918.
1,383,706.
Patented July 5, 1921.
3 SHEETS—SHEET 2.
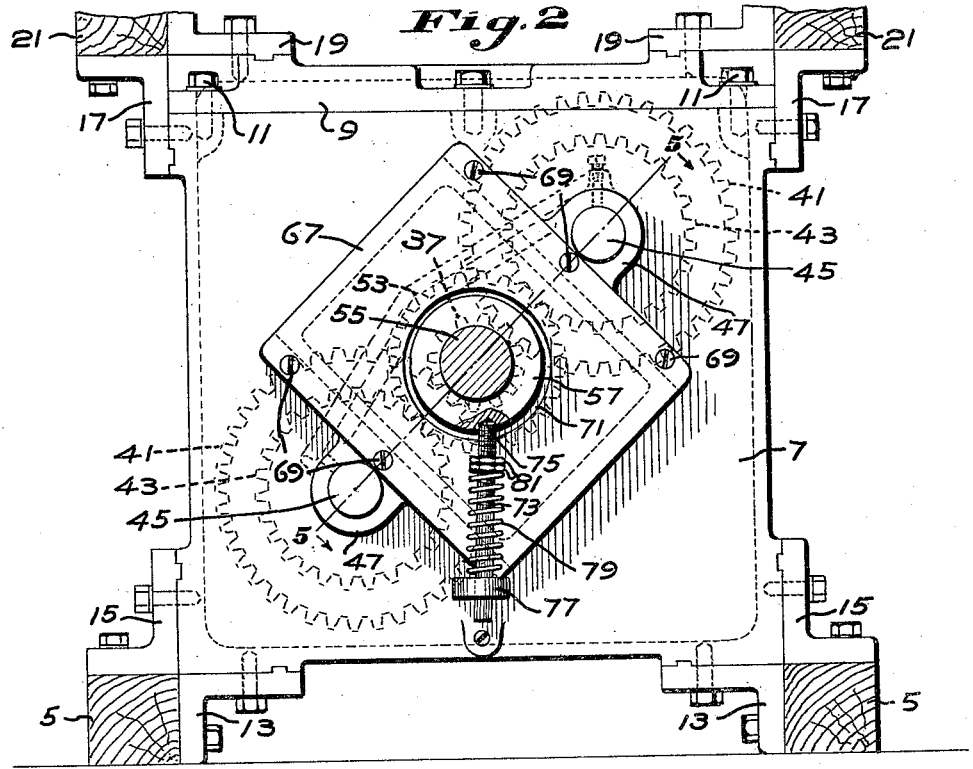
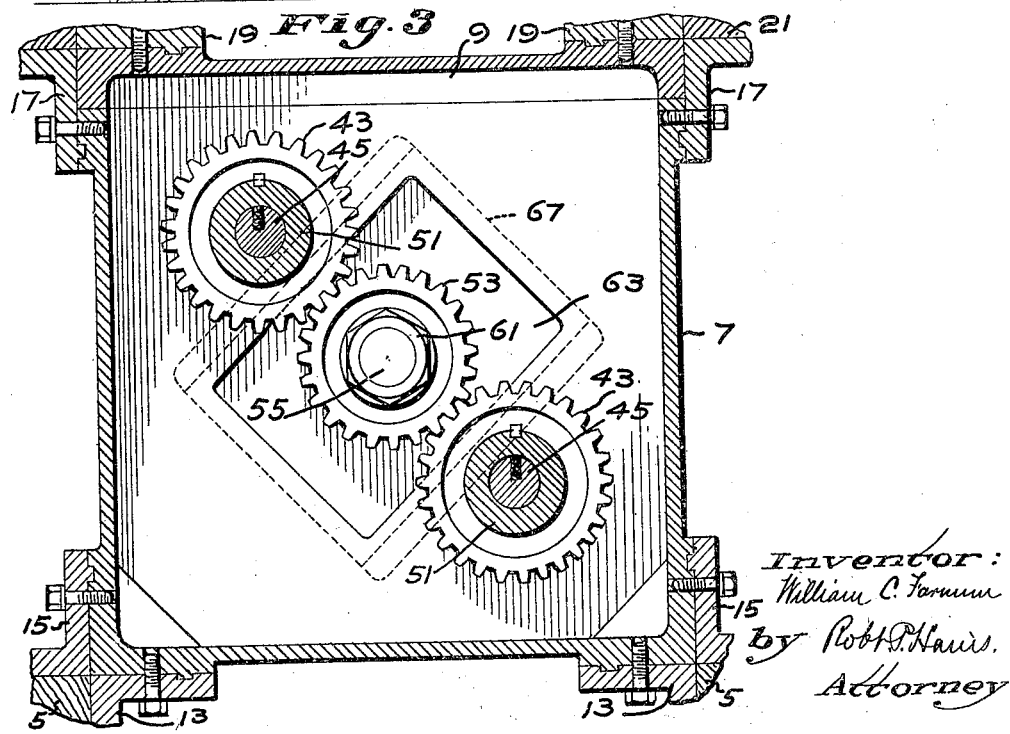
Inventor:
William C. Farnum
by Robt. P. Harris.
Attorney W. C. FARNUM.
GEAR REDUCTION MECHANISM.
APPLICATION FILED DEC. 28, 1918.
1,383,706.
Patented July 5, 1921.
3 SHEETS—SHEET 3.
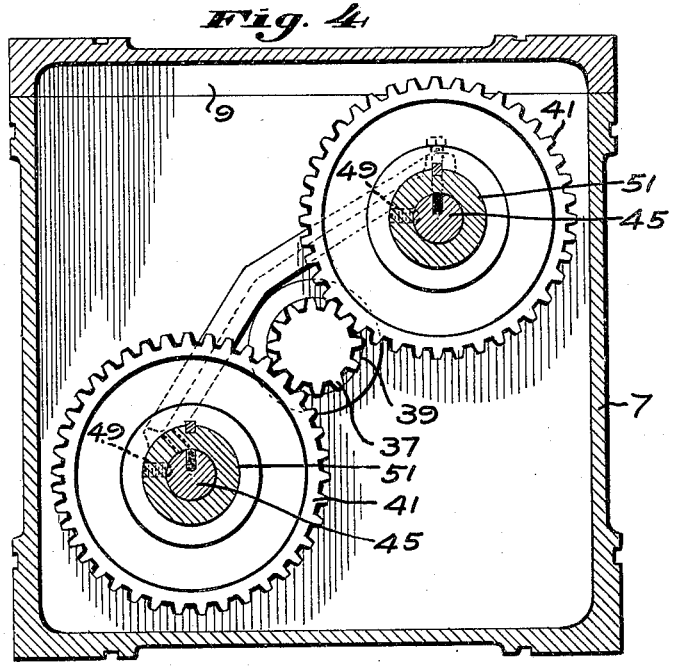
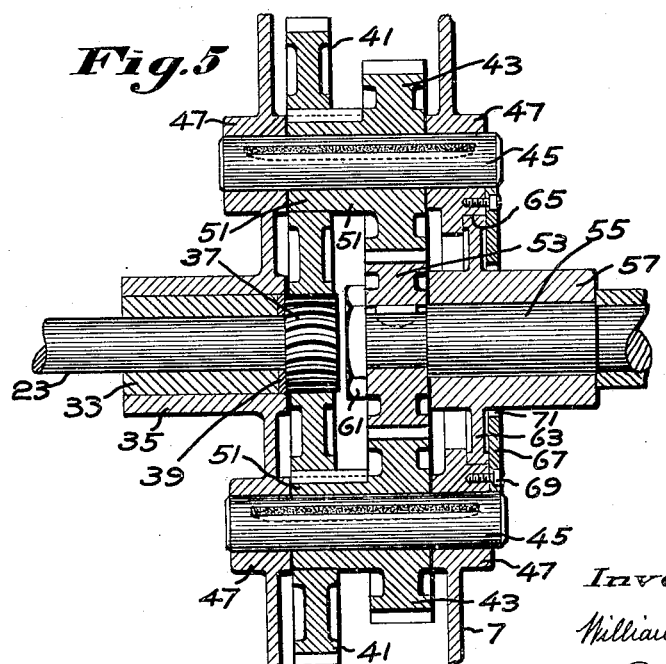
Inventor:
William C. Farnum
by Robt. P. Harris,
Attorney

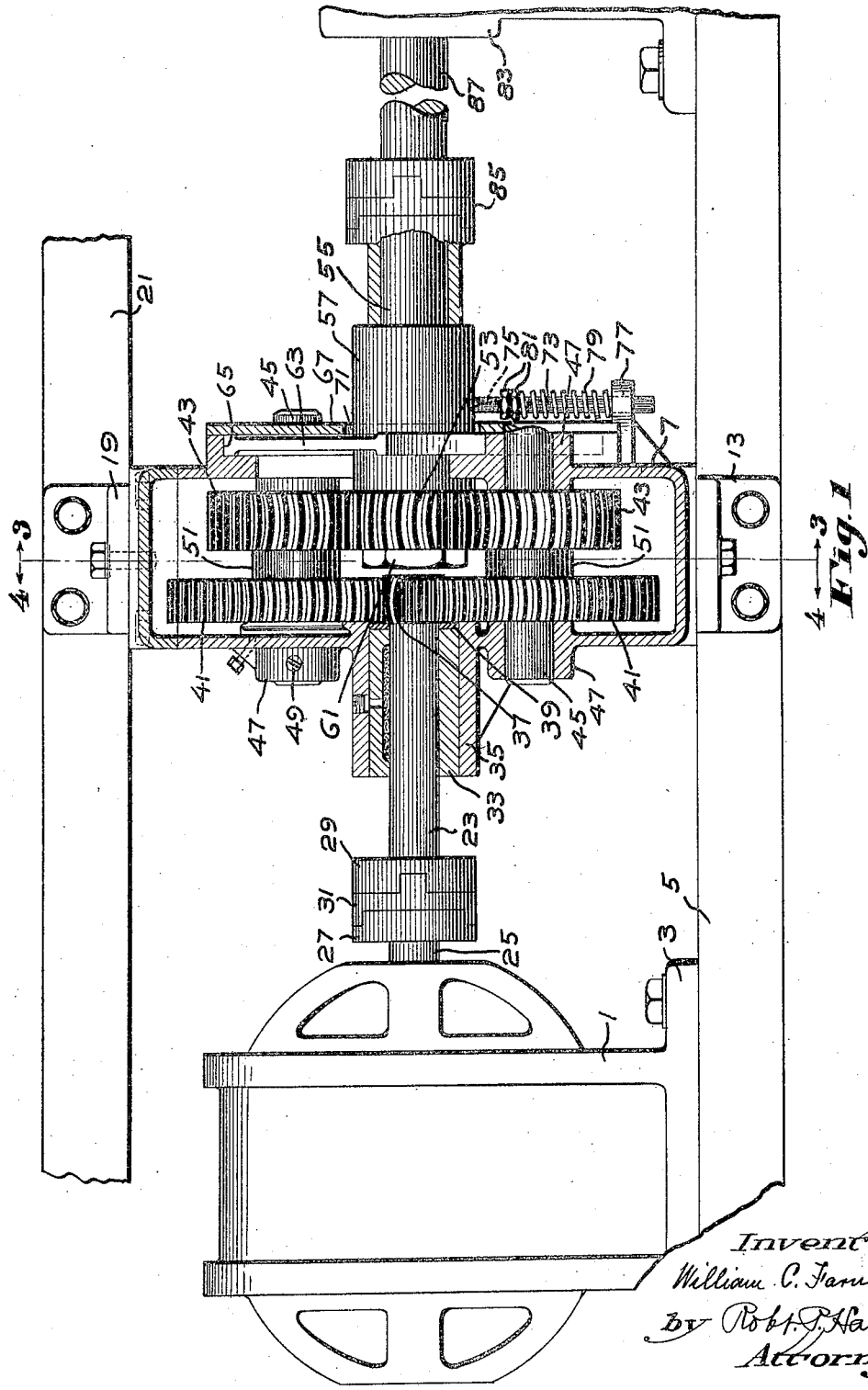

UNITED STATES PATENT OFFICE.

WILLIAM C. FARNUM, OF WINCHENDON, MASSACHUSETTS.

GEAR-REDUCTION MECHANISM.

1,383,706.　　　　　Specification of Letters Patent.　　Patented July 5, 1921.

Application filed December 28, 1918. Serial No. 268,691.

*To all whom it may concern:*

Be it known that I, WILLIAM C. FARNUM, a citizen of the United States, residing at Winchendon, in the county of Worcester and State of Massachusetts, have invented an Improvement in Gear-Reduction Mechanism, of which the following description, in connection with the accompanying drawings, is a specification, like characters on the drawings representing like parts.

The invention to be hereinafter described relates to transmission mechanism for motors and other purposes.

It is desirable in many instances to generate relatively high torque from small high speed electric motors. Heretofore, speed reduction gears have been used for this purpose, but serious objections have been encountered in gearing down such motors.

If the motor shaft drives a pinion, the driving radius of the latter is so small that excessive driving pressure or lead is brought to bear on the teeth of the pinion at a pitch circle thereof, thereby causing said teeth to quickly wear out or become broken; and the shaft for the pinion is pressed against its bearing with an excessive pressure, causing the bearing to become worn and prevent proper intermeshing relation between the teeth of the pinion and the gear driven thereby.

If the motor shaft drives a gear of considerable size instead of a small pinion, in order to reduce the pressure on the teeth of the gear, excessive peripheral speed is developed which renders the use of such gears objectionable.

In my copending application, Serial No. 189,016, filed August 30, 1917, is disclosed a speed reduction mechanism for overcoming the aforesaid objections. In accordance with this mechanism the power means is taken from a small pinion by gears meshing therewith at points distributed circumferentially of the pinion, so that the total power transmitted from the pinion is substantially equally divided among said gears, and thus the driving pressure of the teeth of the pinion on the teeth of the gears meshing therewith is reduced in proportion to the number of gears used. Said mechanism also provides pinions rotating with the gears driven by the motor driven pinion, and meshing with an intermediate gear on a shaft in axial alinement with the shaft for the motor driven pinion.

In order that the driving pressure between the motor driven pinion and the gears meshing therewith may be equally shared by said gears, the motor driven pinion is mounted to float between said gears, so that it may automatically compensate for any irregularities in the gears or improper mesh therewith.

This is a good efficient mechanism for the purposes, but in some cases it is desirable that the driven intermediate gear in axial alinement with the motor driven pinion shall be mounted to float between the pinions meshing therewith and produce the compensating and equalizing effect referred to. One of the objects of the present invention, therefore, is to provide suitable means to allow the driven gear to move bodily or float between the pinions meshing therewith.

The gear should automatically assume a balanced position between the pinions meshing therewith, and will in a sense be carried by said pinions, since the latter are obliged to rotate at the same speed, owing to the fact that they rotate with the gears meshing with the motor driven pinion.

In transmitting power to the intermediate driven gear, the pinion at one side of said gear presses up against the teeth of the gear, and the pinion at the opposite sides of the gear presses down against the teeth of the gear. Consequently, the pressure of the driven gear on its bearing reacting from the rotative force applied thereto is neutralized, and since the force of the pinions are maintained equal, the up and down pressures on the bearing for the driven gear are neutralized.

In order that the driven gear may assume a position to equalize the driving forces thereon from the opposed pinions, means should be provided to relieve said pinions from the weight of the driven gear, its shaft and bearing. Another object of the invention is to provide simple and efficient means to counterbalance the weight of said parts.

And still another object of the invention is to provide a simple, compact, efficient mechanism, the parts of which may be readily assembled.

With the aforesaid and other objects in view, the character of the invention will be best understood from the following description of one good form thereof, shown in the accompanying drawings, wherein:—

Figure 1 is a section through speed reduction gear mechanism embodying the invention, and shown as driven by an electric motor;

Fig. 2 is a side elevation of the mechanism;

Fig. 3 is a vertical section taken on line 3—3 of Fig. 1;

Fig. 4 is a vertical section taken on line 4—4 of Fig. 1; and

Fig. 5 is a section taken on the oblique line 5—5 of Fig. 2.

Referring to the drawings, the transmission mechanism shown therein, in the present instance of the invention, is applied to a small high speed electric motor 1 (Fig. 1) of usual construction, having a base 3 mounted on joists 5. The transmission mechanism may be provided with any suitable housing, but in the present instance, it is inclosed by a casing having a body 7 and a cover 9 detachably secured to the body by screw bolts 11. The casing may be supported in any suitable manner, but herein is secured by angle brackets 13 and 15 to the joists 5 referred to, for supporting the motor, and the upper end of the casing is secured by brackets 17 and 19 to upper joists 21, the construction being such that the mechanism is securely maintained in proper alinement with the motor.

The speed reduction mechanism shown herein as one good form of the invention, comprises a driving shaft 23 which may be flexibly connected to and be driven by the motor shaft 25 by a flexible connection with said shaft. This connection, in the present instance, is in the form of a clutch of the Oldham type comprising a member 27 secured to the motor shaft, and a corresponding member 29 secured to the driving shaft 23, said members having interposed between them a floating member 31 engaged by projections and notches in the members 27 and 29 as well understood in this type of clutch.

The driving shaft 23 is journaled in a bushing 33 mounted in a boss bearing 35 projecting outward from one of the sides of the casing. This shaft may project into the casing and have a pinion 37 fast thereon preferably integral therewith, a suitable washer 39 being confined between the pinion and the inner end of the bushing 33.

Since the driving pinion is directly connected to the motor shaft, it will share the high speed imparted thereto. To reduce this speed, a plurality of large gears may be provided, which may vary in number, but in the present exemplification of the invention, a pair of such gears 41 are provided meshing with the driving pinion at points circumferentially separated thereon and preferably diametrically opposed.

To further reduce the speed transmitted, pinions 43 may be provided, and in the present instance, are loosely journaled on counter shafts 45 mounted in bosses 47 carried by and conveniently integral with opposed sides of the casing, said shafts being secured against rotative and axial movement by set screws 49. The pinions 43, in the present instance, are provided with hubs 51, and the gears 41 referred to, are mounted on these hubs and keyed thereto, the construction being such that the gears 41 and pinions 43 shall rotate together. Movement of the pinions 43 axially of the countershafts may be limited by the inner ends of the bosses 47, although the pinions may be susceptible of slight play between said bosses for a purpose to be described.

The pinions 43 may mesh with an intermediate driven gear 53 at points circumferentially spaced thereon and preferably diametrically opposed.

Next will be described simple and effective means for allowing slight movement of the driven gear 53 bodily with respect to the pinions 43, so that the driven gear may float in such a manner as to always take substantially equal power from the pinions 43 and to relieve pressure of the driven gear shaft on its bearing.

To accomplish this, in the present instance, the driven gear 53 is mounted fast on the reduced end of a shaft 55 mounted in a boss bearing 57 and in substantial axial alinement with the shaft of the driving pinion. The driven gear is confined on the shaft 55 by a nut 61 which is spaced slightly from the driving pinion, as will be noted in Figs. 1 and 5. The boss bearing 57 for the driven shaft 55 is mounted on and is preferably integral with a slide 63 adapted to reciprocate somewhat in an inclined guideway 65 formed in one side of the casing. The slide may be removably held in said guideway by a cover plate 67 secured by screw bolts 69 to the casing, and having an aperture 71 somewhat larger than the boss bearing 57, in order to allow the required movement of the slide in its guideway.

It will be noted that the countershafts and the intermediate shafts are substantially in a plane extending diagonally from one corner to another corner of the casing. Therefore, the bodily movement of the driven gear with respect to the pinions in mesh therewith, will be in a diagonal plane substantially perpendicular to the plane containing said shafts. The weight of the driven gear, its shaft, bearing and slide is partly balanced by the engagement of the slide with the lower side of its guideway. There is, however, a tendency to cause the slide to move down obliquely toward the right of Fig. 2. To balance this effect of gravity, suitable means may be provided, in the present instance, comprising a post 73 having its upper end tapered for entrance into a tapered seat 75 in the side of the boss bearing 57, and having its lower end projecting through a bore in a bracket 77 projecting from and conveniently integral with the casing. A coil spring 79 is confined between the bracket 77 and a pair of nuts 81 threaded to the post. The construction is such that the spring and post will yieldingly support the slide and resist the tendency of gravity urging the slide downward, but will allow sufficient bodily movement of the driven gear to compensate for irregularities in the pinions meshing therewith and in the driven gear, and thereby insure that the driven gear shall take substantially equal power from said pinions.

The driven shaft may serve to transmit power to any instrumentality desired, such, for example, as that conventionally indicated at 83 in Fig. 1. A flexible connection, such, for example, as the Oldham clutch 85, may connect the driven shaft 55 with the shaft 87 of the instrumentality 83, and thereby avoid interference with the automatic floating or bodily movement of the driven gear.

In the present instance of the invention, the gears of the transmission mechanism have curved teeth which may desirably serve to automatically hold the driving pinion and the gears 41 in proper alinement, and automatically hold the driven gear 53 and the pinions 43 in alinement, so that the strength of the full lengths of the teeth of the gears shall be available in transmitting the driving pressure from one to another, and prevent backlash, lost motion and insure accurate engagement of the teeth, even though there may be some inaccuracy in the gears or their mounting. The gears may be susceptible of such slight axial movement as may be necessary to insure the automatic alining action thereof referred to. Since this automatic alining action had from the curved teeth is fully described and claimed in my copending application, further discussion thereof herein will be unnecessary.

By the mechanism described, the high speed of the motor shaft may be greatly reduced by a few gears with a consequent great increase in the torque served by the driven shaft, and the power from the driving pinion to the gears meshing therewith will be equally distributed thereto, and in turn the power from the pinions rotating with the driven gears will be equally taken therefrom by the intermediate gear on the driven shaft. As a result, strain on the teeth of the gears and wear on the bearings of the mechanism is reduced, the life of the mechanism is prolonged, and efficiency thereof is assured.

It will be understood that the invention is not limited to the specific embodiment shown, but that various deviations may be made therefrom without departing from the spirit and scope of the appended claims.

What is claimed is:—

1. A transmission mechanism, comprising, in combination, a driving gear, a driven gear, alined relatively movable shafts for said gears, counter shafts at opposite sides of said shafts, gears on said counter shafts meshing with said driving gear and driven gear respectively, said driven gear being bodily movable in its plane of rotation relative to the gears meshing therewith to equalize the power transmitted through the counter shafts to the driven gear, and means for limiting said movement of the driven gear in its plane of rotation to the path of a straight line.

2. A transmission mechanism, comprising, in combination, a casing having a guide thereon, a slide movably mounted on said guide, a bearing on said slide, a shaft journaled in said bearing, a gear on said shaft, a pair of gears meshing with said gear, a second bearing on said casing, a shaft journaled in said bearing, a gear on said second shaft, and a pair of gears meshing with said second shaft gear and transmitting power to said first pair of gears.

3. A transmission mechanism, comprising, in combination, a casing, two groups of gears mounted in said casing, each including a pair of gears and an intermediate gear meshing therewith, means for operatively connecting each gear of one of said pairs to a corresponding gear of the other pair, a guide on said casing, a slide carrying one of said intermediate gears movably mounted on said guide, a cover plate for said guide, and means including a spring yieldingly to sustain said slide.

4. A transmission mechanism, comprising, in combination, a casing, two groups of gears mounted in said casing, each including a pair of gears and an intermediate gear meshing therewith, means for operatively connecting each gear of one of said pairs to a corresponding gear of the other pair, an inclined guide on said casing, a slide movably mounted on said guide and carrying one of said intermediate gears, and a spring supported element for yieldingly sustaining said slide.

5. A transmission mechanism, comprising, in combination, a casing substantially rectangular in shape having brackets for connection with an under or an overhead support, shafts journaled in bearings adjacent diagonally opposite corners of said casing, gears on said shafts, and intermediate gears meshing with the diagonally opposite gears, one of said intermediate gears being bodily movable with respect to the diagonally opposite gears meshing therewith.

6. A transmission mechanism, comprising in combination, a frame, two groups of gears supported by said frame, each including a pair of gears and an intermediate gear meshing therewith, means for operatively connecting each gear of one of said pairs to a corresponding gear of the other pair, an inclined guide on said frame, and a slide movably mounted on said guide and carrying one of said intermediate gears to permit it to move bodily relatively to the pair of gears with which it meshes.

7. A transmission mechanism, comprising, in combination, a frame, two groups of gears supported by said frame, each including a pair of gears and an intermediate gear meshing therewith, means for operatively connecting each gear of one of said pairs to a corresponding gear of the other pair, an inclined guide on said frame, a slide movably mounted on said guide, a shaft journaled in said slide and having one of said intermediate gears secured thereto, a second shaft rotatably supported in substantial alinement with the first shaft, and a flexible coupling between said shafts.

In testimony whereof, I have signed my name to this specification.

WILLIAM C. FARNUM.